United States Patent
Chalmers et al.

(10) Patent No.: US 6,768,217 B2
(45) Date of Patent: Jul. 27, 2004

(54) WAVE ENERGY CONVERTER SYSTEM OF IMPROVED EFFICIENCY AND SURVIVABILITY

(75) Inventors: Peter Donald Chalmers, South Perth (AU); Jason Robert Liddell, Princeton, NJ (US); William Blaine Powers, Exton, PA (US)

(73) Assignee: Ocean Power Technologies, Inc., Pennington, NJ (US)

(*) Notice: Subject to any disclaimer, the term of this patent is extended or adjusted under 35 U.S.C. 154(b) by 14 days.

(21) Appl. No.: 10/080,181

(22) Filed: Feb. 20, 2002

(65) Prior Publication Data

US 2003/0155774 A1 Aug. 21, 2003

(51) Int. Cl.⁷ ............................................ F03B 13/10
(52) U.S. Cl. .................... 290/53; 290/54; 417/330; 417/331; 417/332
(58) Field of Search ................ 290/53, 54; 417/330, 417/331, 332

(56) References Cited

U.S. PATENT DOCUMENTS

| | | | | | |
|---|---|---|---|---|---|
| 4,076,463 A | * | 2/1978 | Welczer | ...................... | 417/331 |
| 4,455,824 A | * | 6/1984 | Dabringhaus | ................ | 60/507 |
| 4,603,551 A | * | 8/1986 | Wood | .......................... | 60/496 |
| 4,742,241 A | * | 5/1988 | Melvin | ........................ | 290/53 |
| 4,754,157 A | * | 6/1988 | Windle | ........................ | 290/53 |
| 4,851,704 A | * | 7/1989 | Rubi | ............................ | 290/53 |
| 5,324,988 A | * | 6/1994 | Newman | ..................... | 290/54 |
| 5,435,134 A | * | 7/1995 | Nielsen | ........................ | 60/398 |
| 5,842,838 A | * | 12/1998 | Berg | ............................ | 417/331 |
| 6,020,653 A | * | 2/2000 | Woodbridge et al. | .......... | 290/53 |
| 6,140,712 A | * | 10/2000 | Fredriksson et al. | .......... | 290/53 |
| 6,229,225 B1 | * | 5/2001 | Carroll | ........................ | 290/53 |
| 6,392,314 B1 | * | 5/2002 | Dick | ............................ | 290/53 |

FOREIGN PATENT DOCUMENTS

| | | | | | |
|---|---|---|---|---|---|
| FR | 892537 A | * | 4/1944 | | |
| FR | 2423651 A1 | * | 11/1979 | | |
| GB | 2033488 A | * | 5/1980 | ........... | F03B/13/12 |
| WO | WO0106119 A1 | * | 1/2001 | | |

* cited by examiner

Primary Examiner—Joseph Waks
(74) Attorney, Agent, or Firm—Henry I. Schanzer

(57) ABSTRACT

A known type of surface wave energy converter comprises a submerged elongated tube supported by, but being vertically movable relative to, an anchored float. The tube vertically reciprocates in response to overpassing surface waves and drives a transducer for generating useful energy. Improvements include: a motion translator between the tube and the transducer for reducing the stroke length of the transducer and magnifying the force transmitted to the transducer; an energy buffer system for limiting the travel of the tube in response to excessively large surface waves; a gravity anchor for the system for absorbing energy from even greater amplitude waves; means for adjusting buoyancy in response to changing conditions, and pressure relief valves for automatically reducing excessive tube driving pressures caused by excessively large overpassing waves. Energy present in tilting movements of the apparatus are optionally captured in horizontally disposed transducers.

7 Claims, 4 Drawing Sheets

WAVE ENERGY CONVERTER SYSTEM OF IMPROVED EFFICIENCY AND SURVIVABILITY

BACKGROUND OF THE INVENTION

This invention relates to the conversion of mechanical energy present in waves on the surface of bodies of water to useful energy, and particularly to improvements in recently developed apparatus performing such function.

In co-pending U.S. patent applications Ser. No. 09/379,421, filed Aug. 8, 1999 and Ser. No. 09/763,247, filed Feb. 20, 2001 both by Carroll and both assigned to the assignee hereof (the subject matter of both applications being incorporated by reference herein), wave energy converters (WECs) are disclosed comprising elongated, generally (but not necessarily) hollow tube-like members disposed in vertical and preferably completely submerged orientation beneath the surface of a body of water (e.g., an ocean) preferably experiencing large surface waves on a fairly regular basis.

During operation, pressure variations between the top and bottom ends of the vertically elongated, submerged member caused by over-passing surface waves cause relative movements of a piston (e.g., the member itself or a piston disposed within a hollow space within the member) for driving an energy converting transducer.

Experience with such WECs has demonstrated that they can be the basis of a new generation of non-polluting and cost efficient energy sources. A problem with the use of such WECS, particularly in large bodies of water, is that the surface waves are highly variable both in amplitude and shape. Desired goals in the use of such WECs are that efficient operation be obtainable over a wide range of surface wave conditions and that the WECs can survive even the worst storm conditions. These goals are met in accordance with the present invention.

SUMMARY OF THE INVENTION

In a preferred embodiment of the invention, an elongated, neutrally or slightly buoyant first member is disposed in generally upright orientation at a selected depth beneath the mean water level of a body of water. The first member is hollow, with a closed top end and an open bottom end. The first member is mounted, for vertical movements along a path, on a second member comprising a float disposed within the hollow member. The member is also secured to a mechanical energy transducer, e.g., a hydraulic cylinder, for converting vertical movements of the member, in response to over-passing surface waves, to useful energy.

A principal feature of the inventive WECs is that they can accommodate a large range of different size surface waves producing large amplitudes of motion of the movable member while not damaging the apparatus or requiring an exceptionally large mechanical energy transducer. To this end: a) extra large vertical motions of the movable member are accommodated by end-of-stroke buffering with shock-absorbing elements; b) the entire system is gravity anchored to the water body floor, thus allowing lifting of the entire apparatus off the water bed in response to excessive upward movements of the moveable member; c) the moveable member is connected to the mechanical energy transducer by a stroke reducing linkage, e.g., a crank or lever, allowing a long travel of the moveable member but a far shorter travel of the moveable portion of the energy transducer, e.g., a piston of an hydraulic cylinder; d) pressure relief valves (e.g., spring loaded doors) are provided for reducing excessively large pressure differentials caused by excessively large overpassing waves; and e) the vertically extending member is mounted on a base support by a universal joint allowing tilting of the member in response to circulating water movements. (In one embodiment, the vertically extending member is connected to one or more transducers for converting the tilting movements of the vertically extending member to useful energy.)

Intrinsic protection against adverse surface conditions is provided by the normal submerged position of the apparatus. Additional protection is provided by selectively ballasting the apparatus for further sinking the apparatus towards or to the water floor. The selective ballasting mechanism is additionally useful for changing the buoyancy of the movable member in response to changing conditions, e.g., changes in system buoyancy caused by marine growth on the apparatus.

For further isolation from possibly damaging surface conditions, various control and transducer mechanisms, and the like, are disposed within water tight boxes disposed beneath the bottom of the moveable member and preferably on a base member providing the aforementioned gravity anchor on the water floor.

DESCRIPTION OF THE DRAWINGS

FIG. 2 showing, partially broken away, an upper portion of the apparatus, and FIG. 3 showing a lower portion of the apparatus;

DESCRIPTION OF PREFERRED EMBODIMENTS OF THE INVENTION

Figure 1:
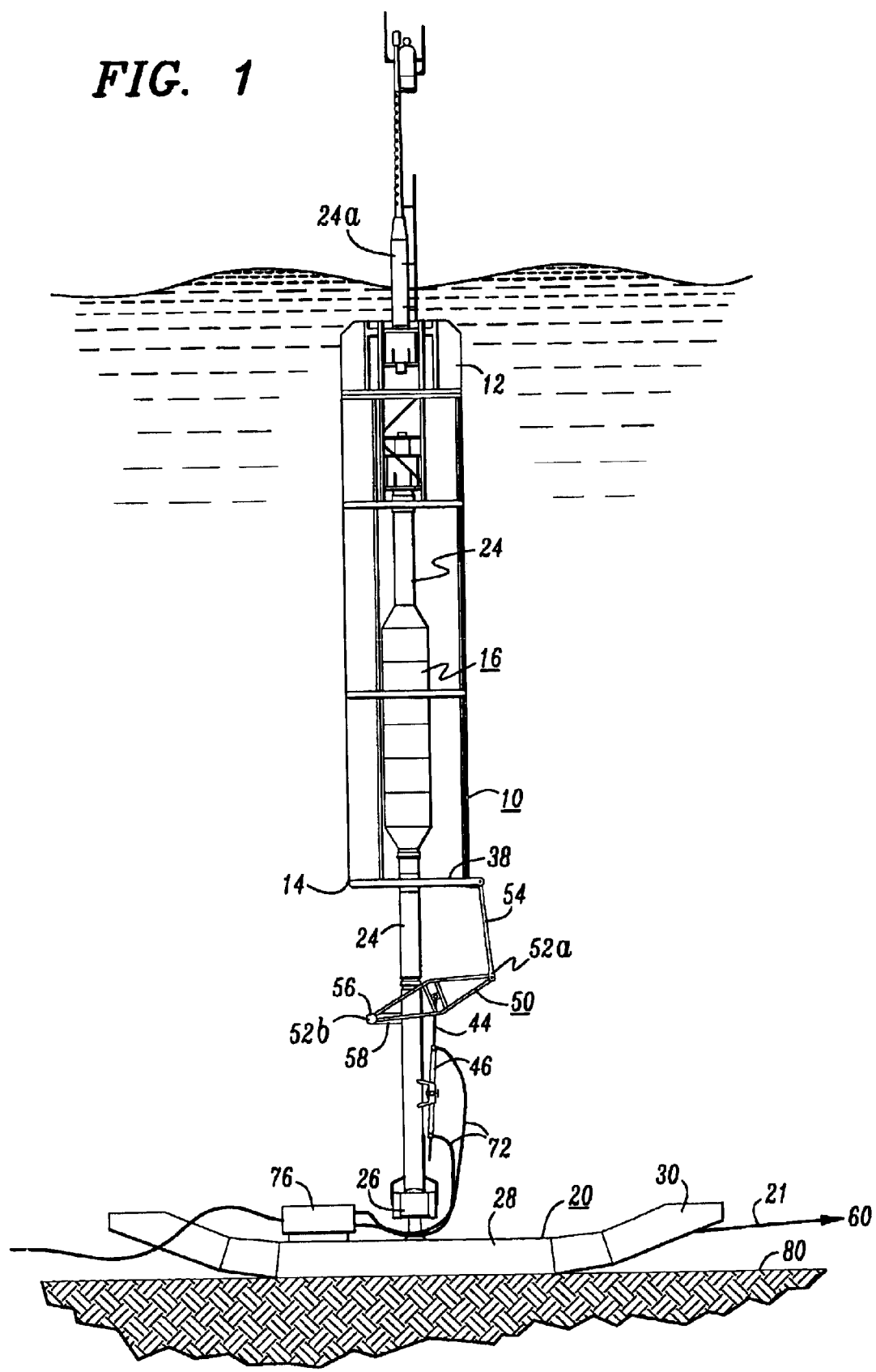
FIG. 1 is a side elevation, partially broken-away, of an apparatus according to the present invention deployed in a body of water, e.g., an ocean.
Figure 2:
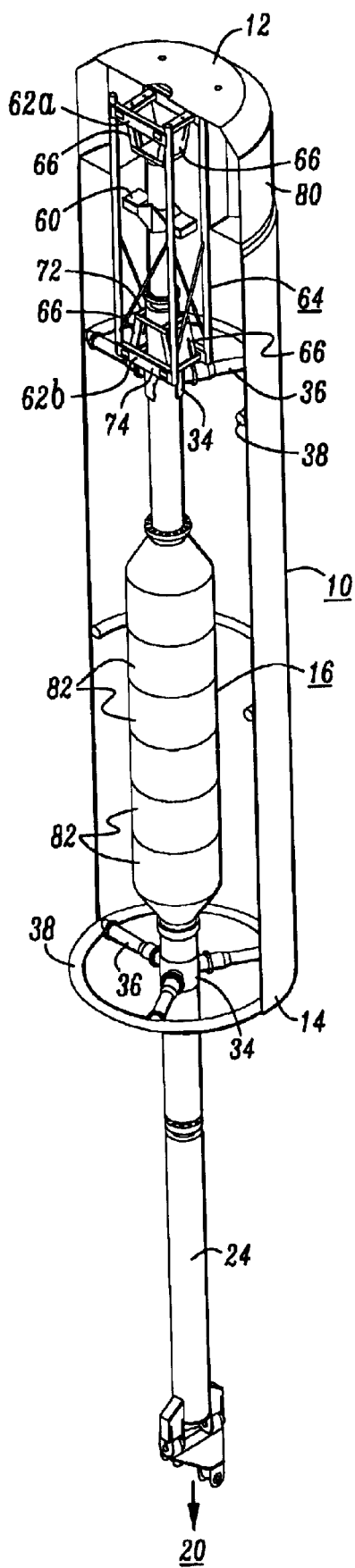
FIGS. 2 and 3 are perspective views of portions of the apparatus shown in FIG. 1.

An overall view of an apparatus according to the present invention is shown in FIG. 1. Certain details of the apparatus are shown more clearly in FIGS. 2 and 3. Shown in FIGS. 1 and 2 is an elongated hollow tube 10 having a closed top end 12 (FIG. 2) and an open bottom end 14. In use, the tube 10 is fully submerged (as hereinafter described) in upright orientation within a body of water, e.g., an ocean having wind driven surface waves.

The principle of operation of the inventive apparatus is that the changes in water energy level, which can be expressed as changes in pressure, due to the passage of wave peaks and troughs, is highest near the surface, and these pressure changes decay exponentially with depth below the surface. Thus, the top of a long fully submerged tube experiences relatively large pressure variations while the bottom of the tube experiences an almost steady pressure essentially unaffected by the passing surface waves. Such steady pressure is essentially equal to the weight of water between the tube bottom and the mean water level. The pressure variations between the top and bottom tube ends cause water (with an open ended tube, as disclosed in the aforecited co-pending application, Ser. No. 09/379,421) to flow down the inside of the tube when a wave peak is over the top end, and water to flow up the inside of the tube when a wave trough is at the top of the tube. This pressurized water flow provides the opportunity to extract mechanical power from the wave energy. With the tube 10, shown herein, having a closed top end, the surface wave induced pressure variations cause the tube 10 to vertically oscillate. How the vertical oscillations are converted to useful energy is now described.

As previously noted, the tube 10 is disposed in generally upright and preferably completely submerged orientation. In the preferred embodiment shown herein (similar to the arrangement shown in afore-cited, co-pending application Ser. No. 09/763,247) the tube 10 is moveable relative to a fixed support. Such support can be a rigid structure mounted on the water bed, but is preferably a float 16 secured to an anchor base 20 anchored to the water body floor by the weight of the anchor base 20 plus that of anchoring chains 21, as hereinafter described.

Most conveniently, the tube 10 (FIG. 2) encloses the float 16 and, because the tube is vertically elongated, the float 16 is similarly elongated.

The float 16 preferably has a large buoyancy, and corresponds to a fixed structure rigidly mounted on the water bed but with the exception that some horizontal displacement of the float can occur in response to horizontal water movements. Such horizontal displacements of the float will generally occur at a slow rate and, essentially, the function of the float 16 is to provide a fixedly positioned support for the tube 10. The selection of the positioning of the tube 10 and the float relative to the mean water level of the body of water is described in the aforecited patent applications.

Figure 3:
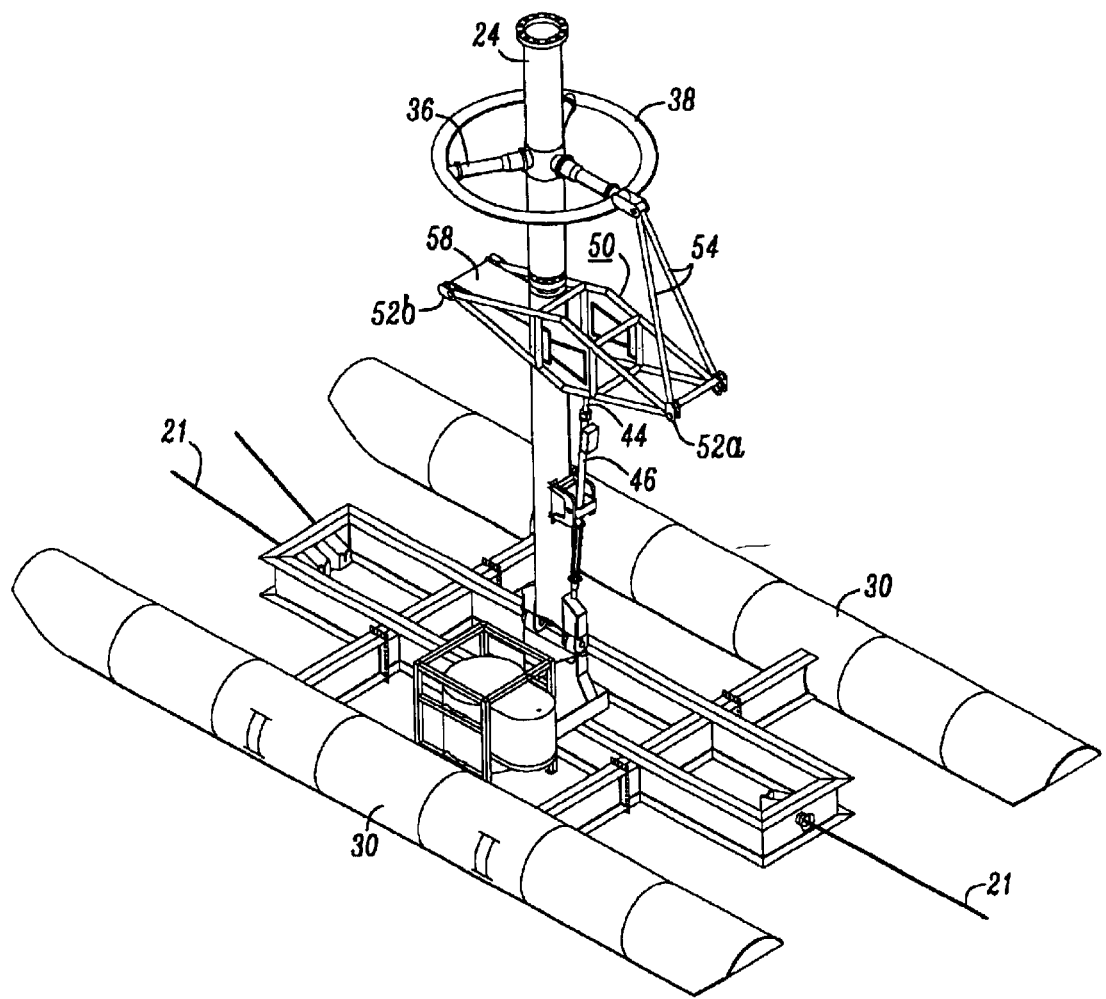

A preferred securing of the float 16 to the anchor base 20 is by means of a tubular column 24 of steel (coated with a marine grade paint) secured to the anchor base by means of a universal joint 26 of known type. Thus, while the column 24 is firmly attached to the anchor base 20, the column can pivot by as much as 90° from the vertical and in any compass direction. Such tilting capability, as described hereinafter, adds both to the survivability of the system and the power output therefrom. The anchor base 20, shown best in FIG. 3, is formed from steel beams terminating, on opposite sides of the base, in a pair of steel pontoons. In the submerged position shown in FIG. 1, the pontoons are filled with water and add to the weight of the base 20. When the pontoons are blown and full of air, the buoyancy of the pontoons, along with that of the float 16, is sufficient to float the entire apparatus shown in FIG. 1. The apparatus can then be towed, in horizontal floating orientation, by a surface vessel for transport and deployment at a selected ocean site. At such site, the pontoons are gradually flooded for a gentle sinking of the base 20 to the ocean bottom; the apparatus automatically assuming the desired vertical orientation.

Various system components, e.g., power converters, sensors and the like, are conveniently mounted on the anchor base 20, thus completely removed from wave action, but accessible, e.g., by a diver, or by a wire sling from the surface, for maintenance or replacement and the like.

The anchor base 20, along with its anchoring chains 21, is of sufficient mass to gravity-anchor the system firmly in place during normal usage, i.e., in connection with surface waves up to maximum amplitude with which the system is designed to safely work. With waves in excess of such maximum amplitude, and generally of such huge forces as could cause damage to the movable portions of the system, the anchor base is of sufficiently small mass as to be completely lifted off the ocean floor to take-up otherwise excessive vertical forces. Thus, during excessive height wave conditions, the anchor base is repeatedly lifted off the ocean floor and re-deposited on the ocean floor without damage to the system. Also, stroking of the tube 10 relative to the float 16 can continue during the base movements whereby power continues to be generated even under otherwise (moderately) dangerous surface storm conditions.

As mentioned, the float 16 is rigidly secured to the anchor base 20 by the tubular column 24. The tube 10 is also mounted on the column 24, but slidably therealong by means of bearings 34 encircling the column 24 and disposed above and below the float 16. In FIG. 2, the lower bearing 34 is shown connected by radial spokes 35 to rings 38 rigidly secured to the inside of the tube 10. At the upper end of the tube 10, as shown in FIG. 2, the securing ring 38 and the bearing 34 are shown broken away with only a single spoke 36 being shown. During operation, the tube 10 reciprocates along the column 24 relative to the float 16.

The tube movement relative to the fixed float is the mechanism for converting wave energy (the force driving the tube) to useful energy. Herein, the tube 10 is rigidly connected (via the ring 38—FIG. 3) to the piston 44 of an hydraulic cylinder 46 rigidly mounted on the column 24. (Other known mechanisms for converting the kinetic energy of the reciprocating tube to useful energy, e.g., an electric generator, can be used.)

A feature of the present invention is that the tube 10 is connected to the hydraulic cylinder piston 44 by a stroke-reducing linkage. This better accommodates typical ocean conditions where the tube movements can vary over a relatively large range while requiring only a shorter range of travel of the cylinder piston 44. One advantage of this is that shorter, hence generally less expensive, hydraulic cylinders can be used.

Herein, the stroke-reducing linkage comprises a lever 50 (FIG. 3) having one end 52a pivotally secured to a pair of rods 54 pivotally secured to the ring 38 at the bottom end 14 of the tube 10 (FIG. 1). Another end 52b of the lever 50 is pivotally secured to the ends of an axel 56 (FIG. 1) rigidly secured, by a post 58, to the column 24. The hydraulic piston 44 is pivotally secured to the lever 50 about midway of the length between the lever two ends 52a and 52b, the stroke reduction thus being about 1:2. Corresponding to such stroke reduction of about 1:2 is a magnification of the force transmitted by the lever 50 of about 2:1. An advantage of this is described hereinafter.

Figure 4:
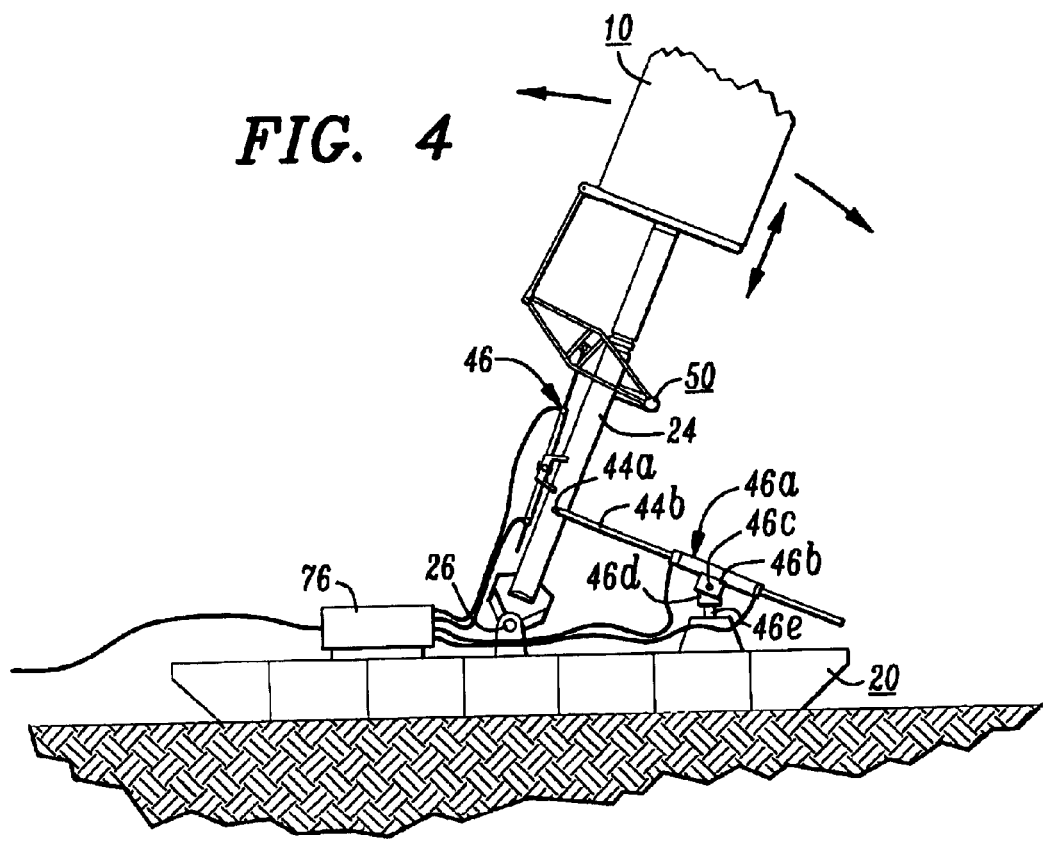
FIG. 4 is a side elevation of a lower portion of an inventive apparatus such as shown in FIG. 1, but showing a modification thereof.

As noted, the column 24 is mounted by a universal joint on the anchor base 20 allowing pivoting or tilting of the column in response to circular water movements caused by overpassing surface waves. For capturing the kinetic energy present in the back-and-forth tilting movements of the column 24 (and the mechanisms mounted thereon), an energy transducer, e.g., a hydraulic cylinder 46a (FIG. 4) similar to the vertically disposed hydraulic cylinder 46, is so disposed for being pumped in response to the tilting movements of the cylinder. Because the column tilting can occur in any direction, the cylinder 46a is mounted for accommodating such movements. Thus, while the cylinder 46a is mounted in generally horizontal orientation on a bracket 46b, the bracket 46b is mounted for vertical rotation about a horizontal axle 46c mounted on a bracket 46d mounted, in turn, for horizontal rotation about a vertical axle 46e secured to the anchor base 20.

By attaching the end 44a of the piston 44b of the hydraulic cylinder 46a close to the pivoting point of the column 24, i.e., just slightly above the universal joint 26, relatively large amounts of column tilt can be accommodated with only relatively small axial movements of the piston 44b.

Several transducers, disposed circumferentially around the column 24, can be used.

A shock absorbing, or stroke buffering, mechanism is also provided for dissipating excessive kinetic energy absorbed by the system in response to excessively high amplitude waves. Energy absorbing, buffering mechanisms are known and different such mechanisms, such as coiled springs, can be used. Herein, as shown in FIG. 2, the stroke buffering mechanism comprises a rigid striker bar 60, e.g., a metal bar, rigidly and fixedly secured to an upper portion of the column 24. Mounted on the tube 10, for movement therewith relative to the fixed striker bar 60, are two shock absorbing assemblies 62a and 62b disposed respectively above and below the striker bar 60. The two assemblies 62a and 62b are rigidly mounted within a support frame assembly 64 comprising a number of interconnected strut members forming a rigid cage rigidly secured to the inside of the tube 10. The absorbing, or stroke-buffering elements of the assemblies 62a and 62b are two pairs of rectangular blocks 68 of an elastic material having known stress-strain characteristics and providing known elastic resistance against impact energy. Each pair of blocks is mounted between a striker frame 72 and an oppositely disposed support frame 74.

In operation, the tube 10, as previously described, moves up and down relative to the fixed-in-place column 24 in response to passing waves. With the most prevalent waves of anticipated amplitude, the movements of the tube 10 are insufficient to bring the shock absorbing assemblies 62a and 62b into contact with the fixed striker bar 60, and all the kinetic energy of the moving tube 10 is available for pumping the hydraulic cylinder 46 for generating useful energy. With overpassing waves of increasing amplitude in excess of the safe operating range of the system, the shock absorbing assemblies 62a and 62b are driven into contact with the striker bar 60, thus braking and stopping further float movements. In the braking process, the elastic blocks 66 of the shock absorbing assemblies 62a and 62b elastically yield for absorbing the kinetic energy of the tube 10 for bringing the tube to a gradual halt in either its up or down movements relative to the column 24.

As noted, other shock absorbing means can be used. An advantage of the system herein used is that it is based upon the use of buffer elements, e.g., the elastic blocks 66 which are commercially available in a wide range of sizes and with known stress-strain characteristics and which have been specifically developed for similar energy absorbing functions. The elastic blocks 66, suitably assembled together between pairs of frames such as shown as frames 72 and 74 in FIG. 2, are commercially available.

While the anchor base 20 is expected to move under storm conditions, it must remain generally in place. To this end, the base 20 is preferably anchored by conventional anchors 60 firmly affixed to the ocean floor but connected to the base by relatively long chains. The long chains provide freedom for the aforementioned lifting movements of the base without allowing escape of the system from its anchored site. Relatively heavy chains are used for adding to the weight of the base 20.

Disposed in both the upper end 12 of tube 10 and the float 16 are buoyancy tanks. In FIG. 2, a tank 80 is shown (one half thereof being cut away for illustrative purposes) at the top of the tube 10, and an in-line series of separate tanks 82 are shown surrounding the column 24 inside the tube 10. A purpose of buoyancy tanks 80 and 82 is that, when surface storms are excessively severe, the buoyancy tanks are flooded to cause sinking of the tube and the float. Because the column 24 supporting the tube and float is secured to the skid base 20 by a universal joint, such "sinking" is accomplished by a tilting of the column for bringing the top end of the system to a safe depth well below the surface wave high energy zone.

A further purpose of the buoyancy tanks 82 in the upper end 12 of the tube 10 is to adjust the buoyancy of the system in response to changes in the mass of the system by marine growth. For example, should marine growth increase the weight of either the tube or the float, so as to cause loss of buoyancy and tilting of the column, water ballast can be removed from the tanks.

Figure 5:
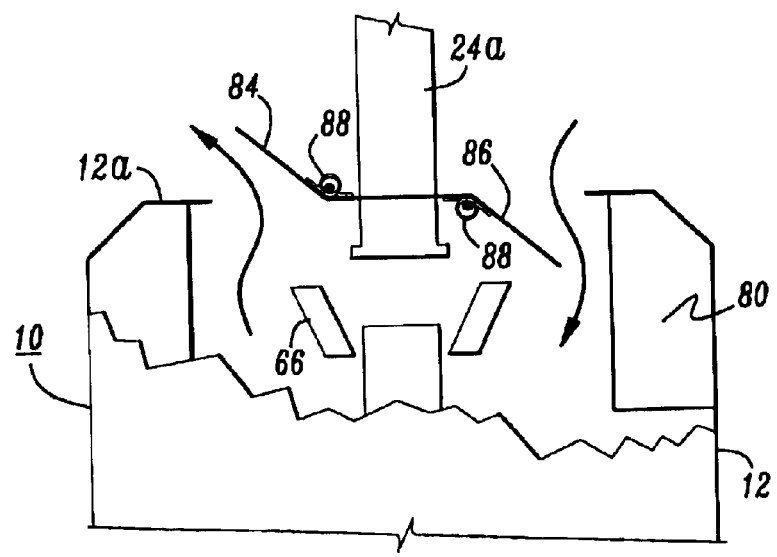
FIG. 5 is a schematic view of an upper portion of an inventive apparatus such as shown in FIG. 1, but showing a modification thereof.

As previously mentioned, and described more fully in the afore-cited patent applications, overpassing surface waves induce pressure variations between the top and bottom ends of the tube 10. Such pressure variations appear across the closed end of the tube between the water within the tube and the surrounding water, and the tube 10 is driven up or down depending upon such pressure variations. With excessively high waves, the pressure differentials can drive the tube 10 with such high forces as to damage the system. A further safety feature, according to the present invention, is the use of pressure relief means at the top end 12 of the tube 10. Most simply, the pressure relief means can comprise (FIG. 5) spring loaded flaps 84 and 86 in the end wall 12a of the upper end 12 of the of the tube 10. Coiled springs 88 are provided for biasing the flap 84 closed against relatively high internal pressure and the flap 86 closed against relatively high external pressure. When the pressure differential, either plus or minus, between the water within the tube 10 and the surrounding water exceeds, across the top closed end of the tube 10, a pre-selected level, the respective spring biased flaps are forced open for immediately reducing the pressure differential and thus immediately reducing the otherwise excessive forces of acceleration on the tube 10.

Pressure relief means, e.g., spring poppet valves and the like, are well known.

Operation of the system is now recapitulated.

During normal operation, i.e., with anticipated water levels and wave amplitudes, the system will rest on the ocean floor in generally fixed, vertical orientation with the top, closed end 12 of the tube 20 at a preselected depth below the mean water level for optimum collection of energy from the waves then most prevalent. As the surface waves pass over the tube 10, the tube bobs up and down relative to the float 16 for pumping the hydraulic cylinder 46 for pressuring oil therein. The pressurized oil (from opposite ends of the cylinder above and below the piston head within the cylinder) is led by pressure hoses 72 to a known transducer 76, e.g., a hydraulic motor driving an electric generator. (It is noted that technology for converting kinetic energy, e.g., derived from water and wind, is well known, and various such energy conversion systems can be used.) A further advantage of the use of the lever 50 mechanism for magnifying the amplitude of the forces transmitted to the hydraulic cylinder is that greater hydraulic pressures can be generated. Such higher pressures, e.g., in the range of 1000 to 2500 psi, are effective (as generally known) for increasing the efficiency of operation of the hydraulic motor and the electrical generator driven by the hydraulic motor.

A major problem faced by all systems intended for permanent installation in an ocean environment is protection and survival against ocean storms. Herein, as the waves increase in amplitude, the wave caused water pressure variations between the tube top and bottom ends increase (in accordance with the surface wave effects previously described), thus tending to increase the stroke length of the tube 10 relative to the float 16. Initially, as the tube 10 is driven with increasing force, the tube excess energy is absorbed by the stroke buffering system described. While energy is thus lost in the buffering system, damage to the system is avoided and, most importantly, energy is still being provided by the system.

With further increases of wave amplitude and further forces on the tube 10, the violent impact of the tube top end 12 with the upper buffer system overcomes the weight of the anchor base 20 thereby lifting it off the ocean floor (but not freeing it from its anchors 60). Lifting the anchor base 20 is also an energy absorbing means, thereby further protecting the system. Note that, for each wave, the base 20 is first lifted and then pushed downwardly against the ocean bed 80, but not so violently to cause any damage. Again, during such movements of the anchor base, energy is still being generated by the system.

With still further larger waves, the pressure relief valves pop open for reducing pressure differentials driving the tube 10. Eventually, should the wave energy become so great that the energy dissipation means are no longer adequate to protect the system, water ballast is taken into the buoyancy tanks for submerging the tube to a depth safely below the surface waves.

During operation, the system controls are disposed safely on the anchor base 20 well beneath the water surface. Although movements of the skid base can occur, as described, the water above and beneath the anchor base tends to buffer movements thereof for partially reducing excessive acceleration and shocks.

As noted, the buoyancy tanks are used for optimizing performance and protecting the system against damage. Repeated operation requires both power and a source of air.

The system generates electrical power, preferably on station (to avoid pumping the hydraulic fluid over long distances) and some electrical power is stored in a battery on the anchor base for working the ballast tanks.

As shown in FIG. 1 (but omitted from FIG. 2), a mast 90 is mounted on the tube 10 upper end for extension above the water surface and the waves thereon whereby the location of the WEC (typically in a field of WECs) can be visually and electronically determined. Also, radio signals can be broadcast detailing the condition of the WEC and radio signals can be received and transmitted by wire to the submerged control system for operation of the system, e.g., flooding and blowing of the ballast tanks 80 and 82. The mast preferably includes an air pipe for pumping air through the mast and into storage tanks for the ballast tanks.

What is claimed is:

1. An apparatus for use in a body of water for capturing energy from surface waves on said water body within a range of amplitudes up to a preselected maximum amplitude, the apparatus comprising a first member for being submerged a first depth beneath the water body surface and being reciprocally movable, in response to overpassing waves, relative to a second member and along a path the length of which is a function of the amplitudes of said overpassing waves; and a base member for anchoring the apparatus on a floor of said water body, said second member being fixedly attached to said base member, said base member having a weight sufficient for maintaining said base member in contact with said floor during the presence of surface waves up to said preselected amplitude while allowing lifting of said base member off said floor during the passage of surface waves having a preselected second amplitude in excess of said first amplitude.

2. An apparatus according to claim 1 including an anchoring means connected to said base member limiting vertical movements of said base member to preselected amounts.

3. An apparatus for use in a body of water for capturing energy from surface waves on said water body within a range of amplitudes up to a preselected maximum amplitude, the apparatus comprising a first member for being submerged a first depth beneath the water body surface and being reciprocally movable, in response to overpassing waves, relative to a second member and along a path a stroke length of which is a function of the amplitudes of said overpassing waves;

a transducer connected to said first member for converting kinetic energy of said first member to useful energy; and a stroke-reducing linkage between said movable first member and a movable portion of said transducer.

4. An apparatus for use in a body of water for capturing energy from surface waves on said water body within a range of amplitudes up to a preselected maximum amplitude, the apparatus comprising a first member for being submerged a first depth beneath the water body surface and being reciprocally movable, in response to overpassing waves, relative to a second member and along a path the length of which is a function of the amplitudes of said overpassing waves; and said second member including buoyancy varying means for decreasing the buoyancy of said second member for causing said second member to tilt away from the vertical in response to the overpassage of surface waves having a preselected amplitude in excess of said preselected maximum amplitude.

5. An apparatus according to claim 4 including a base member for anchoring the apparatus to the floor of the body of water, and said second member being pivotally mounted on said base member for allowing said second member to extend vertically upward from said base member when said second member is positively buoyant, and for allowing tilting of said second member when said second member is negatively buoyant.

6. An apparatus for use in a body of water for capturing energy from surface waves on said water body within a range of amplitudes up to a preselected maximum amplitude, the apparatus comprising a first member for being submerged a first depth beneath the water body surface and being reciprocally movable, in response to overpassing waves, relative to a second member and along a path the length of which is a function of the amplitudes of said overpassing waves; and said first member comprising a hollow tube having a closed top end and an open bottom end, and including pressure relief means in said top end for venting the interior of the top end of said hollow tube to the ambient water upon the build-up of a water pressure differential across said top end in excess of a preselected pressure differential.

7. An apparatus for use in a body of water for capturing energy from surface waves on said water body within a range of amplitudes up to a preselected maximum amplitude, the apparatus comprising a first member for being submerged a first depth beneath the water body surface and being reciprocally movable, in response to overpassing waves, relative to a second member and along a generally vertical path the length of which is a function of the amplitudes of said overpassing waves;

a base member for anchoring the apparatus on a floor of said water body;

said second member being pivotally mounted on said base member and being of such positive buoyancy as to extend substantially vertically upward from said base member;

a first transducer disposed in generally vertical orientation for converting generally vertical movements of said first member to useful energy; and a second transducer connected to said second member for converting kinetic energy present in tiltings of said second member to useful energy.

* * * * *